(12) United States Patent
Hatanaka et al.

(10) Patent No.: US 6,597,421 B1
(45) Date of Patent: Jul. 22, 2003

(54) REFLECTIVE LIQUID CRYSTAL DISPLAY ELEMENT AND IMAGE DISPLAY DEVICE USING THE SAME

(75) Inventors: Takayuki Hatanaka, Ishikawa (JP); Shingo Fujita, Ishikawa (JP); Masaki Nishinaka, Ishikawa (JP); Hiroshi Mizuno, Ishikawa (JP); Tetsu Ogawa, Ishikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 231 days.

(21) Appl. No.: 09/709,405

(22) Filed: Nov. 13, 2000

(30) Foreign Application Priority Data

Dec. 22, 1999 (JP) ............................................. 11-364636
Dec. 22, 1999 (JP) ............................................. 11-364640
Dec. 22, 1999 (JP) ............................................. 11-364642

(51) Int. Cl.⁷ ..................... G02F 1/1333; G02F 1/1335; G02F 1/1345
(52) U.S. Cl. ........................ 349/110; 349/113; 349/149
(58) Field of Search ................................. 349/149, 110, 349/113

(56) References Cited

U.S. PATENT DOCUMENTS

| 5,535,030 A | | 7/1996 | Ogura et al. | |
| 5,684,551 A | * | 11/1997 | Nakamura et al. | 349/99 |
| 6,144,432 A | * | 11/2000 | Hatanaka et al. | 349/119 |
| 6,163,353 A | * | 12/2000 | Ting | 349/113 |
| 6,219,120 B1 | * | 4/2001 | Sasaki et al. | 349/113 |

FOREIGN PATENT DOCUMENTS

| EP | 0867747 A2 | 9/1998 | |
| EP | 0896243 A2 | 2/1999 | |
| EP | 0989441 A1 | 3/2000 | |
| EP | 1024392 A2 | 8/2000 | |
| JP | 08211402 A * | 8/1996 | ......... G02F/1/1345 |
| JP | 10-325953 | 12/1998 | |
| JP | 11-2807 | 1/1999 | |
| JP | 11-14982 | 1/1999 | |
| JP | 11-242215 | 9/1999 | |
| WO | WO 98/52093 | 11/1998 | |

OTHER PUBLICATIONS

"Organic Resin Structure in Liquid Crystal Cell for Cell Thickness Control", XP–002196932, IBM Technical Disclosure Bulletin, vol. 40, No. 12, Dec. 1, 1997, pp. 117–118.

"Color Liquid Crystal Display", XP–000409069, IBM Technical Disclosure Bulletin, vol. 36, No. 5, May 1, 1993, p. 483.

* cited by examiner

*Primary Examiner*—James Dudek
*Assistant Examiner*—Jeanne Di Grazio
(74) *Attorney, Agent, or Firm*—McDermott, Will & Emery

(57) ABSTRACT

A reflective liquid crystal display element including a liquid crystal cell filling between an upper transparent substrate and lower substrate with liquid crystal, a polarizing film disposed at the upper transparent substrate side of the liquid crystal cell, a birefringent film layer disposed between the polarizing film and liquid crystal, cell and light reflecting means disposed at the lower substrate side of the liquid crystal cell. The display element further includes an undulated layer, which is not formed in the connection terminal between the lower substrate side of the liquid crystal cell and the external circuit board. Preferably, the sectional shape of the transparent electrode in the connection terminal between the display area and external circuit is formed in three stair steps.

24 Claims, 7 Drawing Sheets

REFLECTIVE LIQUID CRYSTAL DISPLAY ELEMENT AND IMAGE DISPLAY DEVICE USING THE SAME

FIELD OF THE INVENTION

The present invention relates to a reflective liquid crystal display element used in an image display device.

BACKGROUND OF THE INVENTION

Along with rapid and wide distribution of image display devices used in the data communications field including the cellular phone, PHS, and PDA (personal digital assistants), the infrastructure is being reinforced so as to be capable of accessing easily by anyone regardless of time and place.

These image display devices are designed to be used in mobile applications, and they are required to be lightweight, thin, and low in power consumption, and the liquid crystal display elements are mainly used at the present.

The liquid crystal display elements are designed to display by changing the light transmission intensity by driving the liquid crystal molecules at an effective voltage of several volts, but since the liquid crystal is a non-luminous substance, a light source is needed.

The light source requires a larger electric power than the power for driving the liquid crystal, but by reflecting the ambient light on a reflector provided at the lower side of the liquid crystal display element and making a display, a reflective liquid crystal display element making use of the intrinsic features of the liquid crystal and extremely low in power consumption may be realized.

The reflective liquid crystal display element is now becoming one of the indispensable displays of personal digital assistants.

Also due to increase in the quantity of information, the importance of color display is increasing as the display for personal digital assistants, and in the reflective liquid crystal display elements, several color display methods by using color filter or birefringence effect are proposed.

However, in the reflective liquid crystal display, since it is designed to display by making use of the ambient light, there is a problem of dark display depending on the illumination environment.

As its countermeasure, it has been proposed to focus the reflected light in the front direction of the reflective liquid crystal display element by forming an undulated surface on the reflection plane of the reflector provided at the lower side of the liquid crystal display element.

Figure 4:
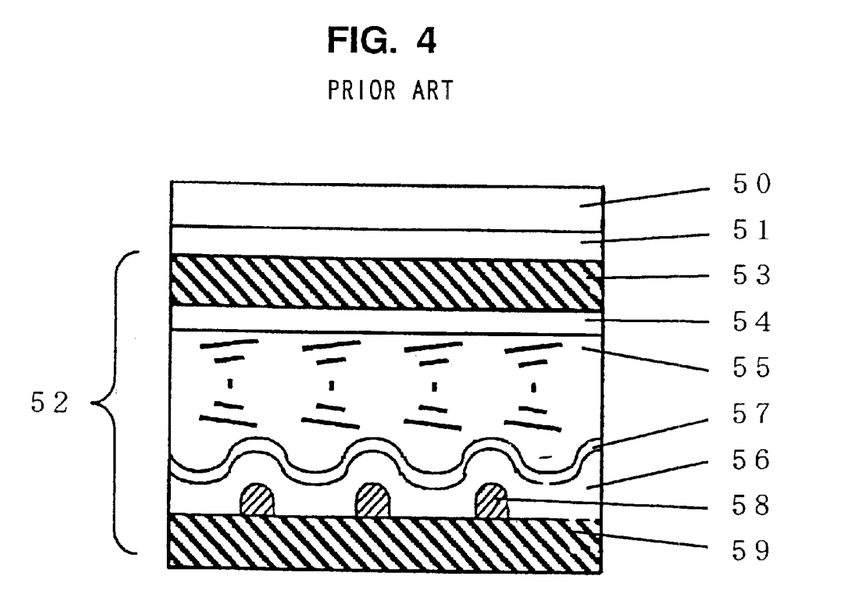
FIG. 4 is a sectional view of a reflective liquid crystal display element in a prior art.

FIG. 4 shows a structure of a reflective liquid-crystal display element in a prior art, in which a conventional reflective liquid crystal display element comprises a polarizer 50, a birefringent film 51, a liquid crystal cell 52, a glass substrate 53, a transparent electrode 54, a liquid crystal layer 55, a smoothing film 56, a reflective metal film 57, a protrusion 58, and a lower glass substrate 59.

In the reflective liquid crystal display element enhanced in brightness by increasing the reflectivity by forming an undulated surface on the reflection plane, however, since the reflective electrode surface at the interface to the liquid crystal is undulated, there is a difference in the thickness of the liquid crystal layer.

Further, since the terminal for connecting with an external circuit is a laminated structure of undulated surface, flattened layer, and transparent electrode, if the terminal pitch is 65 $\mu$m, electric connection may not be sufficient, or terminals are likely to be shorted.

SUMMARY OF THE INVENTION

The reflective liquid crystal display element of the invention is used in an image display device of personal digital assistant such as cellular phone. The reflective liquid crystal display element comprises:

(a) an upper substrate having one or a plurality of birefringent films and polarizing films on one side, and an upper transparent electrode on other side, (b) a lower substrate having an undulated layer, a reflective layer for reflecting the light, a color filter, flattening means for flattening the undulated surface, a lower transparent electrode, and a light shielding layer on one side, and (c) a liquid crystal layer layer disposed between the side of the upper substrate having the upper transparent electrode and the side of the lower substrate having the lower transparent electrode.

The undulated layer is disposed at one side of the lower substrate, the reflective layer is disposed at the liquid crystal layer side of the side having the undulated layer, the color filter is disposed at the liquid crystal layer side of the side having the reflective layer, the flattening means is disposed at the liquid crystal layer side of the side having the color filter, the lower transparent electrode is disposed at the liquid crystal layer side of the side having the flattening means, and the light shielding layer is disposed so as to cover the conductive portion of the reflective layer at the outside peripheral part of the display unit in order to suppress electric contact between the conductive portion of the reflective layer and the lower transparent electrode in the outside peripheral part of the display unit of the reflective liquid crystal display element.

Preferably, the flattening means is disposed at the liquid crystal layer side of the light shielding layer.

In this constitution, the liquid crystal cell and the external circuit can be connected favorably. The terminal does not require the undulated layer and flattened layer. Hence, the reliability of electric connection and physical connection of the terminal and transparent electrode can be enhanced.

DESCRIPTION OF THE PREFERRED EMBODIMENTS

Referring now to the drawings, preferred embodiments of the nation are described below.

Exemplary Embodiment 1

Figure 1A:
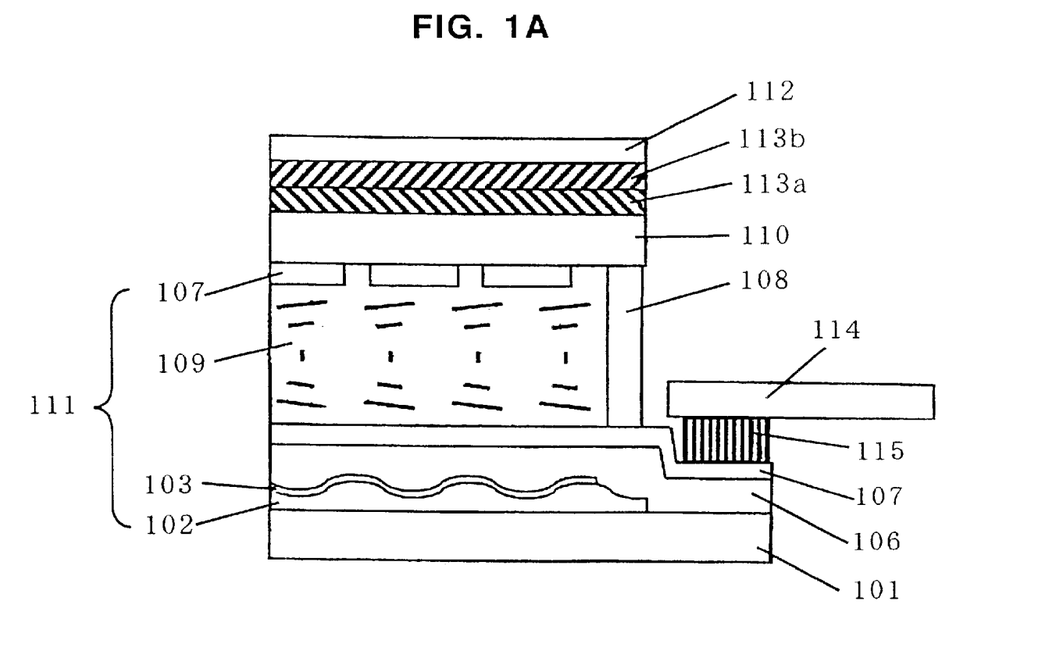
FIG. 1A is a sectional view of a reflective liquid crystal display element in a first embodiment of the invention.

A reflective liquid crystal display element in exemplary embodiment 1 of the invention comprises, as shown in FIG. 1A, a lower substrate (second substrate) 101, an undulated layer 102, a reflective layer 103, a flattened layer (flattening means) 106, a transparent electrode 107, a sealant 108, a liquid crystal layer 109, an upper transparent substrate (first substrate) 110, a liquid crystal cell 111, a polarizing film (polarizer) 112, a first birefringent film 113a, a second birefringent film 113b, an external circuit board 114, and an anisotropic conductive adhesive 115. The reflective liquid crystal display element of the invention further comprises the polarizing film 112 having the liquid crystal 109 sealed between a pair of substrates (upper transparent substrate 110 and lower substrate 101), the polarizing film 112 disposed at the first substrate (upper transparent substrate 110) side of the liquid crystal cell 111, the birefringent films 113a, 113b disposed between the polarized film 112 and the liquid crystal cell 111, and the light reflecting means 103 disposed at the second substrate (lower substrate 101) side of the liquid crystal cell 111. Undulated layer 102 is not formed at the connection terminal between the second substrate (lower substrate 101) side of the liquid crystal cell 111 and the external circuit board 114.

Figure 1B:
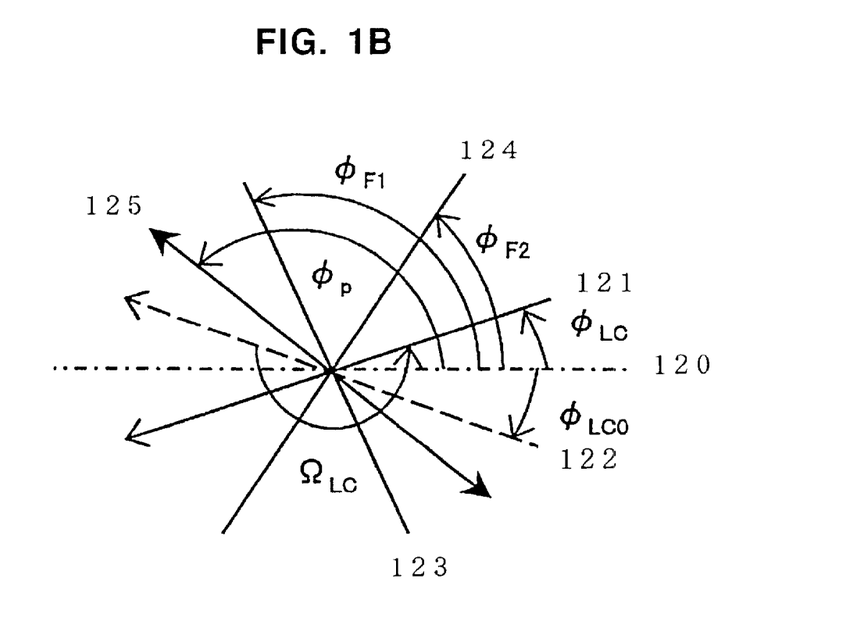
FIG. 1B is an optical block diagram of the reflective liquid crystal display element of the embodiment.

FIG. 1B is an optical block diagram of the reflective liquid crystal display element of the embodiment of the invention, in which the optical composition of the reflective liquid crystal display element includes a reference line 120, an orientation direction 121 of liquid crystal molecule on the upper substrate, an orientation direction 122 of liquid crystal molecule on the lower substrate 101, a phase delaying axis direction 123 of the birefringent film 113a at the side closer to the liquid crystal cell, a phase delaying axis direction 124 of the birefringent film 113b at the polarizing film 112 side, and an absorbing axis direction 125 of the polarizing film 112.

The angle formed by the orientation direction 122 of liquid crystal molecule on the lower substrate 101 and the reference line 120 is $\phi_{LC0}$, the angle formed by the orientation direction 121 of liquid crystal molecule on the upper transparent substrate 110 and the reference line 120 is $\phi_{LC}$, the angle formed by the phase delaying axis direction 123 of the first birefringent film 113a and the reference plane 120 is $\phi_{F1}$, the angle formed by the phase delaying axis direction 124 of the second birefringent film 113b and the reference plane 120 is $\phi_{F2}$, and the angle formed by the absorbing axis direction 125 of the polarizing film 112 and the reference line 120 is $\phi_P$. The twist direction of the liquid crystal is positive. The twist angle of the liquid crystal is $\Omega_{LC}$.

The detail of the structure of the reflective liquid crystal display element in this exemplary embodiment is explained below according to its manufacturing procedure.

First, using glass substrates for the upper transparent substrate 110 and lower substrate 101, a pixel electrode is formed on the upper transparent substrate 110 by using indium tin oxide (ITO) as transparent electrode 107.

On the entire surface of the lower substrate 101, a resin material made of a material stretchable by irradiation with light and heat and capable of controlling the shape of the undulated layer is applied by spin coating, and by shielding the region other than the display area including the connection terminal with the external circuit with a photo mask, ultraviolet rays are emitted in the condition of 80 to 100 mJ/cm².

After developing for a specific time in an organic alkaline solution, it is heated in a clean oven at 150° C. to stretch, and an undulated layer is formed.

At this time, the undulated layer 102 is formed in the display area only, at the average distance between convex portions of 15 $\mu$m, and the average height difference of highest part and lowest part of the undulated layer of 0.4 $\mu$m.

An aluminum film is formed on the undulated layer 102 by vapor deposition, and is irradiated with ultraviolet rays by using photo resist and specified photo mask, then it is etched by using a phosphoric acid etching solution, and a reflective layer 103 is formed.

Further, an acrylic resin film is applied on the reflective layer 103 in a film thickness of 3 $\mu$m, and a flattened layer 106 is formed so that the maximum height difference of convex and concave parts of the surface may be 0.08 $\mu$m.

On the flattened layer 106, a pixel electrode is formed by using indium tin oxide (ITO) as transparent electrode 107.

In this process, the undulated layer 102 and reflective layer 103 can be omitted in the non-display area region including the connection terminal region of the liquid crystal display element.

That is, in the connection terminal, only the flattened film 106 and transparent electrode 107 are formed directly on the lower substrate 101.

The upper transparent substrate 110 and the transparent electrode 107 formed on the lower substrate 101 are oriented by rubbing after forming an orientation film.

In the peripheral area of the upper transparent substrate 110, a thermosetting resin (sealant 108) mixing 1.0 wt. % of glass fiber is printed, and resin beads of specified particle size are distributed on the lower substrate 101 at a rate of 200 beads/mm², and the upper transparent substrate 110 and lower substrate 101 are adhered to each other, and the sealant 108 is cured at 150° C.

In the liquid crystal cell 111, consequently, a mixed liquid crystal cell of ester nematic liquid crystal of Δn=0.14 with a specified amount of chiral agent is injected in vacuum, and it is sealed with ultraviolet curing resin, and cured by irradiation with ultraviolet rays.

On the upper transparent substrate 110 of the liquid crystal cell 111 formed in this manner, a first birefringent film 113a and a second birefringent film 113b with specified retardation values are adhered so that each phase delaying axis may form a specified angle.

Further thereon, as a polarizing film 112, a neutral gray polarizing film (SQ-1852AP of Sumitomo Chemical) with anti-glare (AG) treatment is adhered so that the absorbing axis direction may be a specified angle.

The optical setting values in this exemplary embodiment are as follows.

$\Delta n_{LC} \cdot d_{LC} = 850$ nm, $R_{film}$ (first birefringent film)=500 nm, $R_{film}$ (second birefringent film)=700 nm, $\phi_{LC0} = -35°$, $\phi_{LC} = 35°$, $\Omega_{LC} = 250°$, $\phi_{F1} = 155°$, $\phi_{F2} = 95°$, $\phi_p = 35°$ Results of measuring the optical characteristics are explained below.

By driving at a duty ratio of 1/240, the front characteristics were measured. The contrast was 13.8. The reflectivity of white display in Y value conversion was 58.5%. Hence, favorable characteristics were obtained.

It was confirmed that the display was changed from black display to white display achromatically. Variations of reflectivity in the pixels were within ±0.2%.

Thus, an achromatic black display of low reflectivity and an achromatic white display of high reflectivity were obtained. As a result, a reflective liquid crystal display element having a high contrast was realized.

The retardation value $\Delta n_{LC} \cdot d_{LC}$ of the liquid crystal layer and the retardation value $R_{film}$ of birefringence film (first birefringence film i) used herein are retardation values to the light of $\lambda = 550$ nm.

In the case of simple matrix driving, the twist angle of liquid crystal has an effect on the duty ratio which is the number of selectable electrodes. The larger the twist angle, the smaller is the duty ratio. Accordingly, the number of selectable electrodes can be increased, so that the number of pixels can be increased.

In this embodiment, by controlling the twist angle of the liquid crystal in a range of 220 to 270°, a favorable display can be obtained by driving at a duty ratio of 1/200 or less.

In the connection terminal region with the external circuit, the flattened layer 106 and transparent electrode 107 are directly formed on the lower substrate 101. As a result, the flatness at the interface of the transparent electrode 107 and anisotropic conductive adhesive 115 is enhanced. Therefore, the pitch can be narrowed in the electrodes at the terminal for connecting with the external circuit board 114 through the anisotropic conductive adhesive 115. As a result, a higher definition of the image display is realized.

That is, when the undulated layer 102 is also formed in the terminal, and the flattened layer 106 and transparent electrode 107 are formed on the undulated layer 102, with the electrode pitch at the terminal of 65 μm, as in the conventional reflective liquid crystal display element, wire breakage and shorting between adjacent terminals are likely to occur often. By contrast, in the embodiment shown in FIG. 1A, in which undulated layer 102 is not formed on the lower substrate 101 at the terminal, and the flattened layer 106 and transparent electrode 107 are formed directly on the lower substrate 101, occurrence of wire breakage and shorting can be prevented. As a result, the reliability of connection is enhanced.

Exemplary Embodiment 2

Figure 1C:
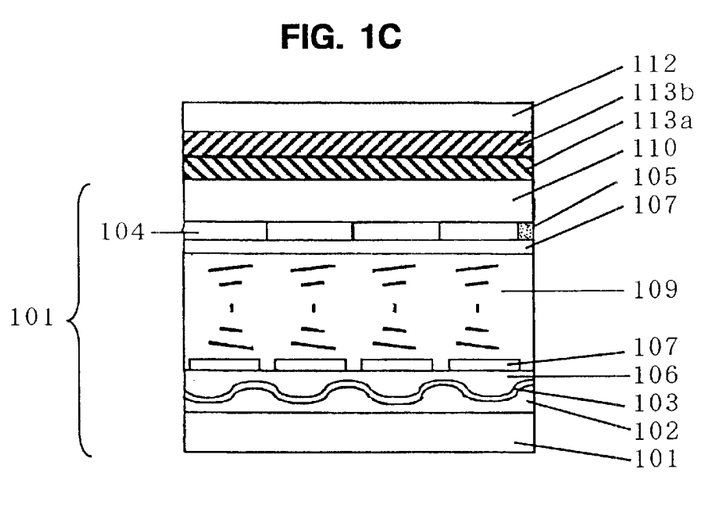
FIG. 1C is a sectional view showing a structure of forming a color filter on an upper substrate of a reflective liquid crystal display element in a second embodiment of the invention.
Figure 1D:
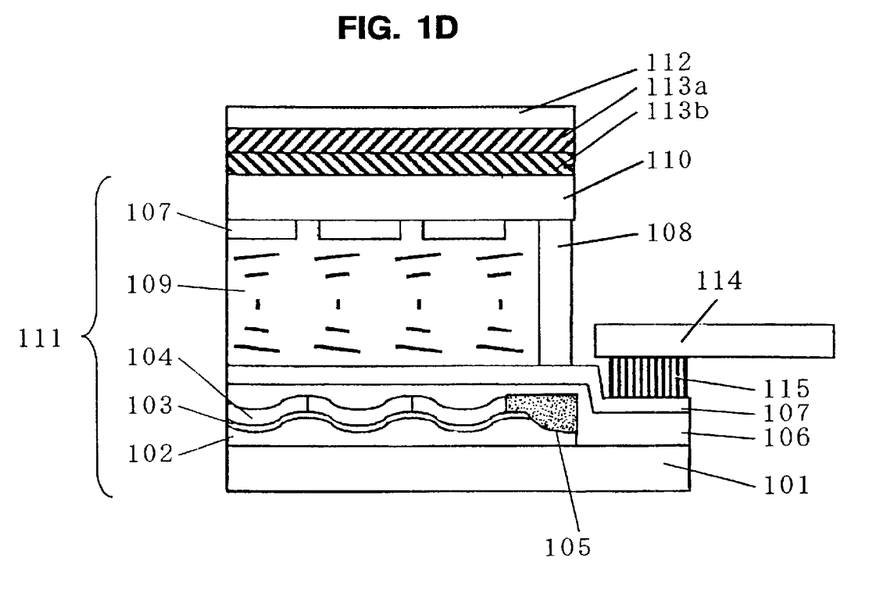
FIG. 1D is a sectional view showing a structure of forming a color filter on a lower substrate of the reflective liquid crystal display element of the second embodiment.

A second exemplary embodiment of the invention is explained by referring to FIG. 1C, FIG. 1D and the optical block diagram in FIG. 1B.

The reflective liquid crystal display element of exemplary embodiment 2 includes a color filter. The other principal components and manufacturing procedure are nearly same as in the case of exemplary embodiment 1 mentioned above.

This exemplary embodiment is, therefore, same as exemplary embodiment 1 unless particularly explained. Components having the same reference numerals as in exemplary embodiment 1 have the same functions unless otherwise explained.

As shown in FIG. 1C, the reflective liquid crystal display element of this exemplary embodiment comprises a color filter pattern 104 and a peripheral black matrix 105, and the color filter includes the color filter pattern 104 and peripheral black matrix 105.

In FIG. 1C, the color filter is disposed on the upper substrate 110. In FIG. 1D, the color filter is disposed on the lower substrate 101.

The detail of the structure of the reflective liquid crystal display element in this exemplary embodiment is explained below according to its manufacturing procedure.

First, as shown in FIG. 1C, the peripheral black matrix 105 and color filter pattern 104 are sequentially formed on the upper transparent substrate 110. Then, a pixel electrode is formed by using indium tin oxide (ITO) as transparent electrode 107.

The structure shown in FIG. 1D is explained. First, an undulated layer 102 is formed on the lower substrate 101 by using a light and heat stretchable resin. This light and heat stretchable resin is made of a material stretchable by irradiation with light and heat, and this material can control the shape of the undulated layer by irradiation with light and heat.

Further thereon, a reflective layer 103 is formed by vapor deposition of aluminum. The peripheral black matrix 105 and color filter pattern 104 are formed thereon.

Moreover, an acrylic resin is applied thereon in a thickness of 3 μm, and a flattened layer 106 is further provided. Then, a pixel electrode is formed by using indium tin oxide (ITO) as transparent electrode 107.

Herein, the forming method of the color filter pattern 104 includes a printing method of transferring the pattern formed on a printing plate onto the substrate surface through a blanket, and a pigment dispersion method of applying a color filter layer forming resist dispersing pigment on the substrate, and forming by photolithography. By this method, the color filter pattern 104 in stripes of red, green and blue colors was formed.

The black matrix 105 was formed also by printing method or photolithography same as in the case of the color filter pattern 104. The undulated layer 102, reflective layer 103 and flattened layer 106 were formed in the same method as in exemplary embodiment 1. The liquid crystal cell 111, birefringent film layers 113a, 113b, and polarizing film 112 were formed in the same manufacturing procedure as in exemplary embodiment 1. Thus, the reflective liquid crystal display element was fabricated.

The twist angle of this liquid crystal is in a range of 220 to 270°.

In this structure, since the color filter is disposed, color display is realized. In particular, in the case of the structure shown in FIG. 1D, by the flattened layer 106 and color filter (color filter pattern 104 and black matrix 105), as compared with the case of the flattened layer 106 only, the height difference of the undulated surface of the flattened layer is smaller, and the uniformity of the liquid crystal layer thickness of the liquid crystal panel is enhanced.

Therefore, a white display of uniform brightness and a high contrast are obtained, and a reflective liquid crystal display element having favorable optical characteristics capable of presenting an achromatic black and white display is obtained.

In a practical example of the reflective liquid crystal display element of the exemplary embodiment, its effects are explained.

$\Delta n_{LC} \cdot d_{LC} = 850$ nm, $R_{film}$ (1)=500 nm, $R_{film}$ (2)=700 nm, $\phi_{LC0} = -35°$, $\phi_{LC} = 35°$, $\Omega_{LC} = 250°$, $\phi_{F1} = 155°$, $\phi_{F2} = 95°$, $\phi_p = 35°$ The optical setting values in this exemplary embodiment are as follows.

The optical characteristics were measured as the front characteristics at a duty ratio of 1/240. As a result, the contrast was 14.5, and the reflectivity of white display in Y value conversion was 19.1%. Hence, favorable characteristics were obtained.

Moreover, since the display is changed from black display to white display achromatically, display of 16 gradations and 4096 colors was possible. Variations of reflectivity in the pixels were within ±0.1%.

Thus, an achromatic black display of low reflectivity and an achromatic white display of high reflectivity were obtained. As a result, a reflective liquid crystal display element having a high contrast was realized.

The retardation value $\Delta n_{LC} \cdot d_{LC}$ of the liquid crystal layer and the retardation value $R_{film}$ of birefringence film (first birefringence film) used herein are retardation values to the light of $\lambda = 550$ nm.

Exemplary Embodiment 3

Figure 2A:
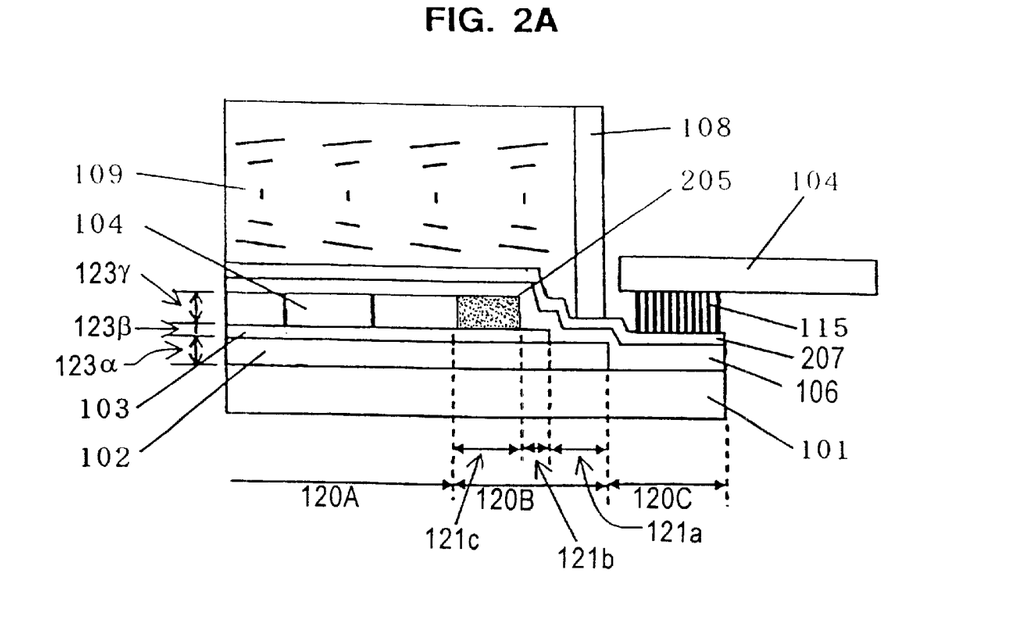
FIG. 2A is a sectional view showing a structure of forming a color filter on a lower substrate of a reflective liquid crystal display element in a third embodiment of the invention.
Figure 2B:
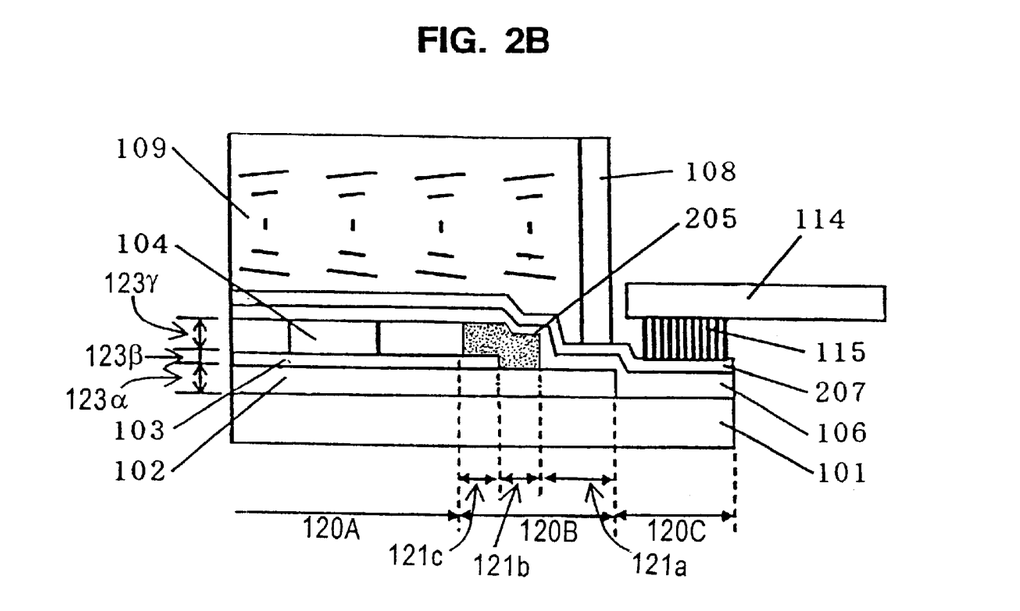
FIG. 2B is a sectional view showing peripheral parts of undulated layer, reflective layer and peripheral black matrix for composing the reflective liquid crystal display element of the third embodiment.

An exemplary embodiment 3 of the invention is explained by referring to FIG. 2A and FIG. 2B.

In the reflective liquid crystal display element of exemplary embodiment 3, the transparent electrode is formed in stair steps. The other principal components and manufacturing procedure are nearly same as in the case of exemplary embodiment 1 and exemplary embodiment 2 mentioned above.

This exemplary embodiment is, therefore, same as exemplary embodiment 1 or 2 unless particularly explained. Components having the same reference numerals as in exemplary embodiment 1 or 2 have the same functions unless otherwise explained.

In FIG. 2A and FIG. 2B, the reflective liquid crystal display element comprises a display area 120A, a region 120B between the display area 120A (the inside edge of the peripheral black matrix) and outside edge of the undulated layer 102, and a region 120C between the outside edge of the undulated layer 102 and the edge of the glass substrate 101. The thickness of the undulated layer 102 is 123α. The thickness of the reflective layer 103 is 123β. The thickness of the black matrix 205 is 123γ.

In FIG. 2A, the peripheral part of the second substrate (lower substrate 101) of the reflective liquid crystal display element is mainly explained below.

The peripheral black matrix 205 is formed so that the outside edge of the peripheral black matrix 205 may be located between the display area 120A and the outside edge of the undulated layer 102 (the region 120B in FIG. 2A).

In the structure shown in FIG. 2A, the outside edge of the peripheral black matrix 205 is formed inside of the reflective layer 103.

In this configuration, the sectional shape of the transparent electrode 207 between the display area 120A and the connection terminal (region 120C) with the external circuit can be formed in stairs of three steps, that is, the step 123γ of display area 120A and region 121b, step 123β of region 121b and region 121a, and step 123α of region 121a and region 120C. Thus, wire breakage of transparent electrode 207 can be prevented.

In particular, as shown in FIG. 2B, by composing so that the outside edge of the reflective layer 103 may be within the region of the peripheral black matrix 205 (between display area 120A and region 121a), the effect of preventing shorting between transparent electrode 207 and reflective layer 103 is obtained at the same time.

In this exemplary embodiment, the sealant 108 is disposed in the area (region 121a) forming the undulated layer 102, flattened layer 106, and transparent electrode 207, but it is not particularly limited. For example, the sealant 108 is disposed in (a) the area (region 121b) forming the undulated layer 102, reflective layer 103, flattened layer 106, and stepped transparent electrode 207, (b) the area (region 121c) forming the undulated layer 102, reflective layer 103, peripheral black matrix 205, flattened layer 106, and transparent electrode 207, or (c) the area (region 121b) forming the undulated layer 102, peripheral black matrix 205, flattened layer 106, and stepped transparent electrode 207. Same effects are obtained in such structures.

In the foregoing exemplary embodiments 1, 2 and 3, aluminum is used as the reflective layer 103, but it is not limited to this. For example, a metal reflective layer containing silver may be used as the reflective layer 103. The same effects are obtained in this composition.

As the birefringent films, two birefringent films having retardation values of 500 nm and 700 nm are used, but the retardation value and optical axis angle are not particularly specified. For example, one or a plurality of birefringent films may be used. In this constitution, too, the same effects are obtained.

The optical axis angle of the polarizing film is not limited to the specified angle. Same effects are obtained at other angles.

Exemplary Embodiment 4

Figure 3A:
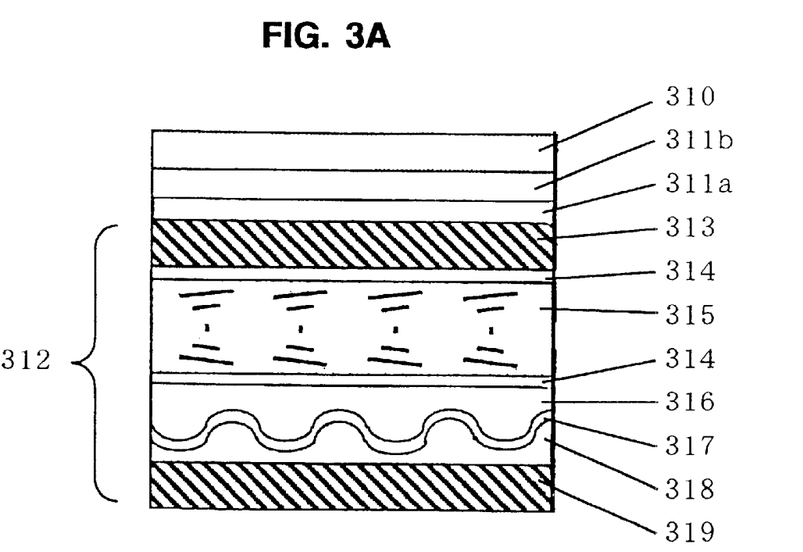
FIG. 3A is a sectional view of a reflective liquid crystal display element in a fourth embodiment of the invention.

An exemplary embodiment 4 of the invention is explained by referring to FIG. 3A.

As shown in FIG. 3A, a reflective liquid crystal display element in this exemplary embodiment comprises a polarizing film (polarizer) 310, a first birefringent film 311a, a second birefringent film 311b, a liquid crystal cell 312, an upper transparent substrate (upper substrate) 313, a transparent electrode 314, a liquid crystal layer 315, a flattened layer 316 of flattening means, a reflective layer 317, an undulated layer 318, and a lower substrate 319.

FIG. 1B is an optical block diagram of the reflective liquid crystal display element of the embodiment of the invention. The optical composition includes a reference line 120, an orientation direction 121 of liquid crystal molecule on the upper substrate, an orientation direction 122 of liquid crystal molecule on the lower substrate, a phase delaying axis direction 123 of the first birefringent film at the side closer to the liquid crystal cell, a phase delaying axis direction 124 of the second birefringent film at the polarizing film side, and an absorbing axis direction 125 of the polarizing film.

The angle formed by the orientation direction 122 of liquid crystal molecule on the lower substrate 319 and the reference line 120 is $\phi_{LC0}$. The angle formed by the orientation direction 121 of liquid crystal molecule on the upper transparent substrate 313 and the reference line 120 is $\phi_{LC}$. The angle formed by the phase delaying axis direction 123 of the first birefringent film 311a and the reference line 120 is $\phi_{F1}$. The angle formed by the phase delaying axis direction 124 of the second birefringent film 311b and the reference line 120 is $\phi_{F2}$. The angle formed by the absorbing axis direction 125 of the polarizing film 310 and the reference line 120 is $\phi_p$. The twist direction of the liquid crystal is positive. The twist angle of the liquid crystal is $\Omega_{LC}$.

The detail of the structure of the reflective liquid crystal display element in this exemplary embodiment is explained below according to its manufacturing procedure.

First, using glass substrates for the upper transparent substrate 313 and lower substrate 319, a pixel electrode is formed on the upper transparent substrate 313 by using indium tin oxide (ITO) as transparent electrode 314.

An undulated layer 318 is made of a material stretchable by irradiation of light and heat. On the entire surface of the lower substrate 319, a resin stretchable by irradiation with light and heat is applied by spin coating. By this method, the shape of the undulated layer can be controlled.

Light and ultraviolet rays are emitted in the condition of 80 to 100 mJ/cm². It is heated in a clean oven at 150° C. By this method, the heat stretchable resin is stretched. As a result, the undulated layer 318 is formed at the average distance between convex portions of 1 μm, and the average height difference of highest part and lowest part of the undulated area of 0.4 μm.

Silver is formed on this undulated layer 318 by vapor deposition. Thus, a reflective layer 317 is formed. Further, a film of SiO₂ is applied on the reflective layer 317 as a flattened layer 316 in a film thickness of 2 μm. The maximum height difference of convex and concave parts of the surface of the flattened layer 316 was 0.08 μm.

On the flattened layer 316, a pixel electrode is formed by using indium tin oxide (ITO) as transparent electrode 314.

An orientation film was formed on the upper transparent substrate 313 and the transparent electrode 314 formed on the lower substrate 319. Then, by rubbing, the orientation film was oriented.

In the peripheral area of the upper transparent substrate 314, a thermosetting sealing resin mixing 1.0 wt. % of glass fiber was printed. On the lower substrate 319, resin beads of specified particle size were distributed at a rate of 200 beads/mm², and the upper transparent substrate 314 and lower substrate 319 were adhered to each other. Then the sealing resin was cured at 150° C.

Consequently, a mixed liquid crystal cell of ester nematic liquid crystal of Δn=0.14 with a specified amount of chiral agent was injected in vacuum between the upper transparent substrate 314 and lower substrate 319. Then the opening was sealed with ultraviolet curing resin. The resin was then cured by emitting ultraviolet rays to the ultraviolet curing resin.

On the upper transparent substrate 313 of the liquid crystal cell 312 formed in this manner, a first birefringent film 311a and a second birefringent film 311b were adhered. At this time, these films are adhered so that each phase delaying axis may form a specified angle in the films having specified retardation values individually.

Further thereon, as a polarizing film 311 is adhered so that the absorbing axis direction may be a specified angle. As the polarizing film 311, a neutral gray polarizing film (SQ-1852AP of Sumitomo Chemical) with anti-glare (AG) treatment is used.

The optical setting values in this exemplary embodiment are as follows.

$\phi_{LC0}=-35°$, $\phi_{LC}=35°$, $\Omega_{LC}=250°$, $\phi_{F1}=155°$, $\phi_{F2}=95°$, $\phi_p=35°$ In the condition of $|R_{film}$ (second birefringent film)$-R_{film}$ (first birefringent film)$|\leq 200$ nm, by varying $\Delta n_{LC} \cdot d_{LC}$, the optical characteristics in the reflection mode were measured.

As a result, a reflective liquid crystal display element of normally black mode was obtained, which was capable of presenting an achromatic black display of low reflectivity and an achromatic white display of high reflectivity in a range of 700 nm to 1000 nm. Besides, the black display and white display were uniform in the pixels.

The composition of the reflective liquid crystal display element has a retardation difference of liquid crystal capable of presenting white display and black display sufficiently, and a range of compensating coloring due to birefringent effect of liquid crystal. Accordingly, the above effects were obtained.

In the case of simple matrix driving of liquid crystal, the twist angle of liquid crystal has an effect on the duty ratio which is the number of selectable electrodes. The larger the twist angle, the smaller is the duty ratio. Accordingly, the number of selectable electrodes can be increased. As a result, the number of pixels can be increased.

By setting the twist angle of the liquid crystal in a range of 220 to 270°, a favorable display can be obtained by driving at a duty ratio of 1/200 or less.

In a next case, the optical values are set are as follows.

$\Delta n_{LC} \cdot d_{LC}=850$ nm, $R_{film}$ (first birefringent film)=500 nm, $R_{film}$ (second birefringent film)=700 nm, $\phi_{LC0}=-35°$, $\phi_{LC}=35°$, $\Omega_{LC}=250°$, $\phi_{F1}=155°$, $\phi_{F2}=95°$, $\phi_p=35°$ The optical characteristics were measured as the front characteristics at a duty ratio of 1/240. As a result, the contrast was 13.8, and the reflectivity of white display in Y value conversion was 58.5%. Hence, favorable characteristics were obtained.

Moreover, the display was changed from black display to white display achromatically. Variations of reflectivity in the pixels were within ±0.2%.

Thus, an achromatic black display of low reflectivity and an achromatic white display of high reflectivity were obtained. As a result, a reflective liquid crystal display element having a high contrast was realized.

The retardation value $\Delta n_{LC} \cdot d_{LC}$ of the liquid crystal layer and the retardation value $R_{film}$ of birefringence film (first birefringence film) used herein are retardation values to the light of λ=550 nm.

Exemplary Embodiment 5

Figure 3B:
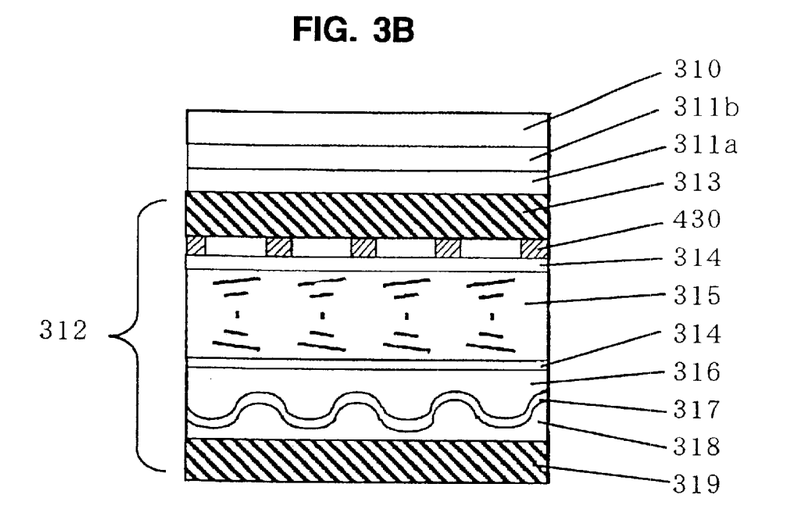
FIG. 3B is a sectional view showing a structure of forming a color filter on an upper substrate of a reflective liquid crystal display element in a fifth embodiment of the invention.

An exemplary embodiment 5 of the invention is explained by referring to FIG. 3B.

The reflective liquid crystal display element of this exemplary embodiment includes a color filter.

The other principal components and manufacturing procedure are nearly same as in the case of exemplary embodiment 4 mentioned above.

This exemplary embodiment is, therefore, same as exemplary embodiment 4 unless particularly explained, and components having the same reference numerals as in exemplary embodiment 4 have the same functions unless otherwise explained.

The optical composition of the reflective liquid crystal display element in this embodiment is explained by referring to FIG. 1B.

Figure 3C:
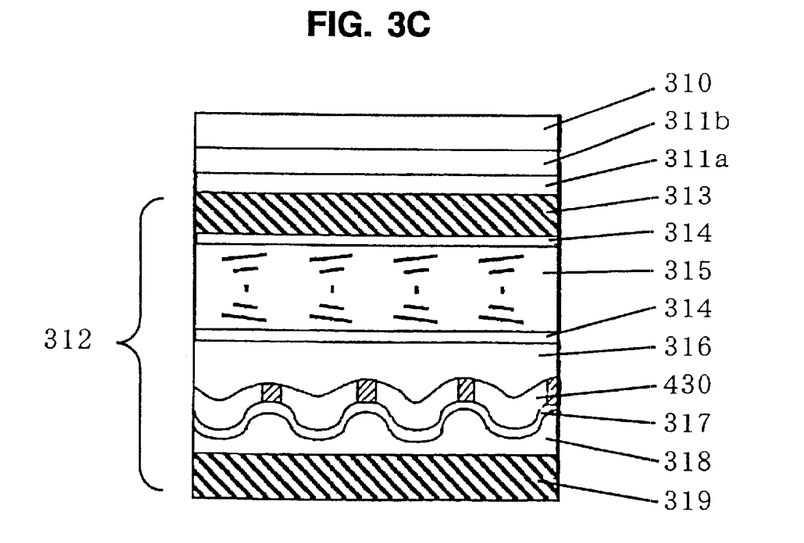
FIG. 3C is a sectional view showing a structure of forming a color filter on a lower substrate of the reflective liquid crystal display element of the fifth embodiment.

In FIG. 3B and FIG. 3C, the reflective liquid crystal display element has a color filter 430. Therefore, the color filter 430 is disposed on the upper transparent substrate 313 in FIG. 3B. The color filter 430 is disposed on the lower substrate 319 in FIG. 3C.

The detail of the structure of the reflective liquid crystal display element in this exemplary embodiment is explained below according to its manufacturing procedure.

First, as shown in FIG. 3B, the color filter 430 is formed on the upper transparent substrate 313. Then, a transparent electrode 314 using indium tin oxide (ITO) is formed thereon. The transparent electrode 314 has a function of pixel electrode.

Next, the element composed as shown in FIG. 3C is explained. A stretchable resin material stretchable by irradiation with light and heat is applied on the upper surface of the lower substrate 319. Thus, an undulated layer 318 is formed.

A color filter 430 is formed on the undulated layer 318. Then applying silver by vapor deposition, and a reflective layer 317 was formed.

Further, $SiO_2$ was applied on the reflective layer 317 in a film thickness of 2 $\mu$m, and a flattened layer 316 was placed. Then, a pixel electrode was formed by using indium tin oxide (ITO) as transparent electrode 314.

Herein, the forming method of the color filter 430 includes (a) a printing method of transferring the pattern formed on a printing plate onto the substrate surface through a blanket, and (b) a photolithographic method of applying a color filter layer forming resist dispersing pigment on the substrate, and the color filter 430 in stripes of red, green and blue colors was formed.

Then, the reflective liquid crystal display element was manufactured in the same procedure as in the exemplary embodiment 4.

In the reflective liquid crystal display element thus obtained, the twist angle of the liquid crystal is in a range of 220 to 270°, and the retardation value expressed as the product $\Delta n_{LC} \cdot d_{LC}$ of the birefringence $\Delta n_{LC}$ of liquid crystal and liquid crystal layer thickness $d_{LC}$ is in a range of 700 nm to 1000 nm, so that color display is realized.

In particular, in the case of the reflective liquid crystal display element having the structure as shown in FIG. 3C, by the flattened layer 316 and color filter 430, as compared with the case of the reflective liquid crystal display element having the flattened layer 316 only, the height difference of the undulated surface of the flattened layer is smaller, and the uniformity of the liquid crystal layer thickness of the liquid crystal panel is enhanced.

Therefore, a white display of uniform brightness in the pixel and a high contrast are obtained. Further a reflective liquid crystal display element having favorable optical characteristics capable of presenting an achromatic black and white display is obtained.

In a practical example of the reflective liquid crystal display element of the exemplary embodiment, its effects are explained.

The optical setting values in this exemplary embodiment are as follows.

$\Delta n_{LC} \cdot d_{LC} = 850$ nm, $R_{film}(1) = 500$ nm, $R_{film}(2) = 700$ nm, $\phi_{LC0} = -35°$, $\phi_{LC} = 35°$, $\Omega_{LC} = 250°$, $\phi_{F1} = 155°$, $\phi_{F2} = 95°$, $\phi_p = 35°$ The optical characteristics were measured as the front characteristics at a duty ratio of 1/240. As a result, the contrast was 14.5, and the reflectivity of white display in Y value conversion was 19.1%. Hence, favorable characteristics were obtained.

Moreover, since the display is changed from black display to white display achromatically, display of 16 gradations and 4096 colors was possible. Variations of reflectivity in the pixels were within ±0.1%.

Thus, an achromatic black display of low reflectivity and an achromatic white display of high reflectivity were obtained. As a result, a reflective liquid crystal display element having a high contrast was realized.

The retardation value $\Delta n_{LC} \cdot d_{LC}$ of the liquid crystal layer and the retardation value $R_{film}$ of birefringence film (first birefringence film) used herein are retardation values to the light of $\lambda = 550$ nm.

Exemplary Embodiment 6

An exemplary embodiment 6 of the invention is explained by referring to the drawings. In the reflective liquid crystal display element of the embodiment, the principal components and manufacturing procedure are nearly same as in the case of exemplary embodiment 4 mentioned above.

The components of this exemplary embodiment are, therefore, same as those in exemplary embodiment 4 unless particularly explained, and are identified with same reference numerals as in exemplary embodiment 4. The same components as in exemplary embodiment 4 have the same functions as in exemplary embodiment 4 unless otherwise explained.

Figure 3D:
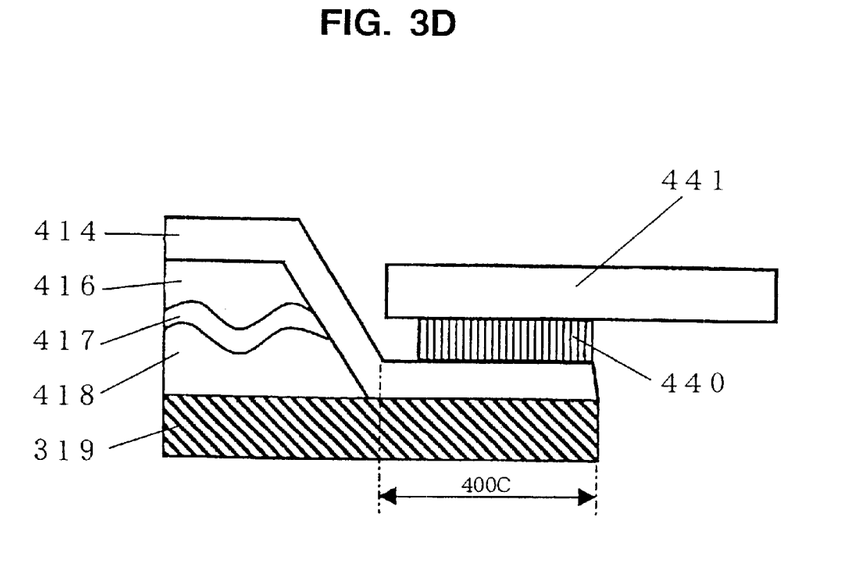
FIG. 3D is a sectional view showing a connection terminal of a reflective liquid crystal display element in a sixth embodiment of the invention.

This exemplary embodiment is explained by referring to FIG. 3A and FIG. 3D which are magnified sectional views of the connection terminal on the lower substrate. In a non-display area region 400C, a transparent electrode 414 is directly formed on the lower substrate 319. An external circuit board 441 is disposed on the transparent electrode 414 by way of an anisotropic conductive adhesive 440.

The detail of the structure of the reflective liquid crystal display element of the embodiment is explained according to its manufacturing procedure.

A heat-stretchable resin was applied on the entire surface of the lower substrate 319 corresponding to the second substrate by spin coating. The heat-stretchable resin has a property of stretching by irradiation with light and heat.

Using a photo mask, consequently, ultraviolet rays of 80 to 100 mJ/cm$^2$ were emitted. The photo mask shields the region excluding the display area including the connection terminal with external circuit.

Developing by using an organic alkaline solution for a specific time, the unnecessary portion of the heat-stretchable resin was removed. The remaining heat-stretchable resin was heated in a clean oven at 150° C., and stretched. Thus, an undulated layer 418 was formed.

At this time, the undulated layer 418 is formed in the display area only. The average distance between convex portions of the undulated layer 418 is 15 μm, and the average height difference of the highest part and lowest part of undulated surface is 0.4 μm.

A reflective layer 417 was formed on the undulated layer 418 by vapor deposition of silver.

On the reflective layer 417, SiO$_2$ film was formed as a flattened layer 416 in a film thickness of 2 μm. The maximum height difference of undulation of the surface of the flattened layer 416 is 0.008 μm.

By this process, as shown in FIG. 3D, disposition of undulated layer 418, reflective layer 417 and flattened layer 416 is not necessary in the non-display area region 400C including the connection terminal with external circuit, so that the process can be omitted.

That is, in the connection terminal, the transparent electrode 414 is formed directly on the lower substrate 319. Hence, the pitch can be narrowed at the terminal for connecting with the external circuit board 441 through the anisotropic conductive adhesive 440. As a result, the definition of image display in the display device is extremely enhanced.

Exemplary Embodiment 7

Figure 5:
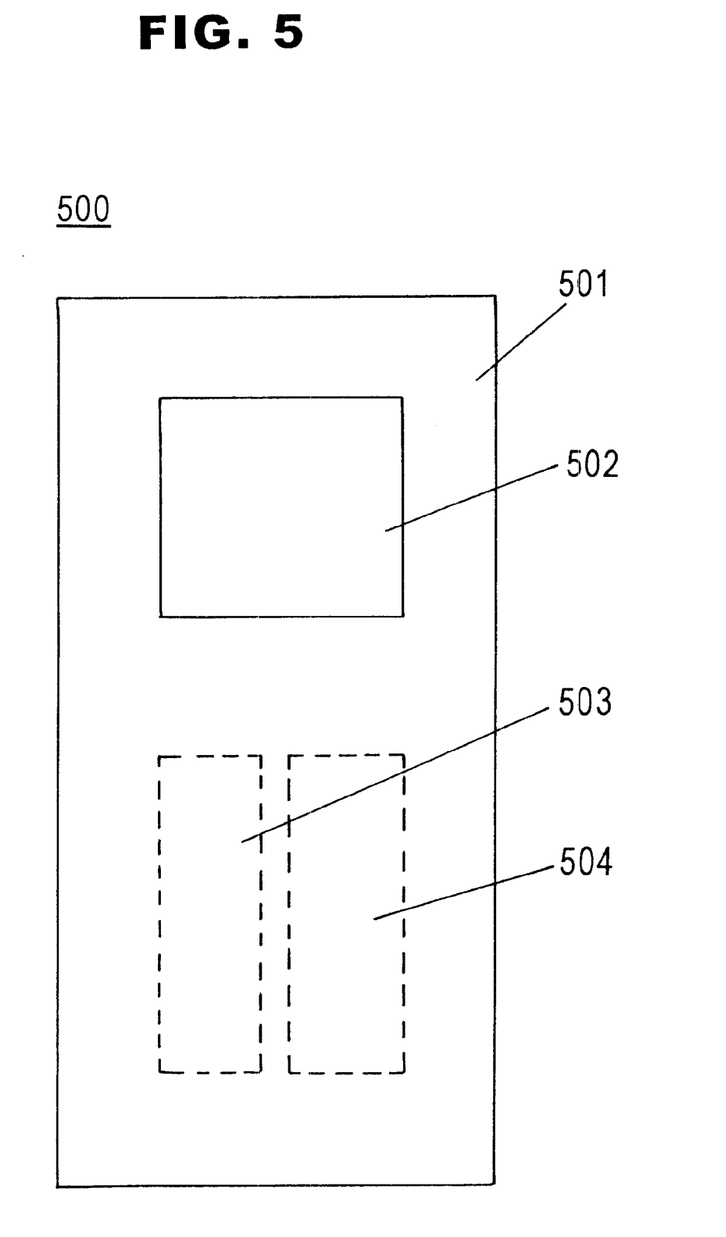
FIG. 5 is a schematic diagram of a liquid crystal display device having a reflective liquid crystal display element in an embodiment of the invention.

A schematic view of an image display device using a reflective liquid crystal display element in an embodiment of the invention is shown in FIG. 5. In FIG. 5, the image display device is a cellular phone. The image display device 500 comprises a case 501, a liquid crystal display element 502 disposed in the case, a first functional part 503 for driving the liquid crystal display element 502, and a second functional part 504 having a telephone function. As the liquid crystal display element 502, any one of the reflective liquid crystal display elements explained in exemplary embodiments 1, 2, 3, 4, 5, and 6 may be used. In this structure, an image display device having a lightweight and thin structure, a low power consumption, and an excellent image display is obtained.

In the foregoing exemplary embodiments 4, 5 and 6, silver is used as the reflective layers 317, 417, but it is not limited to this. For example, a metal reflective layer containing aluminum may be used as the reflective layers 317, 417. The same effects are obtained in this composition.

As the birefringent films, two birefringent films consisting of a film having retardation value of 500 nm and a film having retardation value of 700 nm are used, but other structure is also possible. For example, the birefringent film may have other retardation value. Or the optical axis angle may be different. One or a plurality of birefringent films may be used. In such constitution, too, the same effects are obtained.

What is claimed is:

1. A reflective liquid crystal display element comprising:
   (a) an upper substrate, said upper substrate including:
      a birefringent film and a polarizing film disposed at one side thereof, and
      an upper transparent electrode disposed on the other side thereof,
   (b) a lower substrate, said lower substrate including, at one side thereof,
      an undulated layer,
      a reflective layer for reflecting light,
      a color filter,
      flattening means for flattening said undulated layer,
      a lower transparent electrode, and
      a light shielding layer, and
   (c) a liquid crystal layer, said liquid crystal layer being disposed between the side of the upper substrate having the upper transparent electrode and the side of the lower substrate having the lower transparent electrode,
   wherein said upper substrate, lower substrate and liquid crystal layer form a display unit, said undulated layer is disposed at the one side of the lower substrate, said reflective layer is disposed at the liquid crystal layer side having the undulated layer, said color filter is disposed at the liquid crystal layer side having the reflective layer, said flattening means is disposed at the liquid crystal layer side having the color filter, said lower transparent electrode is disposed at the liquid crystal layer side having the flattening means, and
   said light shielding layer is disposed in order to suppress electric contact between the conductive portion of the reflective layer and the lower transparent electrode in the outside peripheral part of the display unit, and cover the conductive portion of the reflective layer in the outside peripheral part of the display unit.

2. The reflective liquid crystal display element of claim 1, wherein said flattening means is disposed at the liquid crystal layer side of the light shielding layer.

3. A reflective liquid crystal display element comprising:
   (a) an upper substrate, said upper substrate including
      a birefringent film and a polarizing film disposed at one side thereof, and
      an upper transparent electrode disposed on the other side thereof,
   (b) a lower substrate, said lower substrate including, at one side thereof,
      an undulated layer,
      a reflective layer for reflecting light,
      a color filter,
      lower side flattening means for flattening said undulated layer,
      a lower transparent electrode, and
      a light shielding layer, and
   (c) a liquid crystal layer, said liquid crystal layer being disposed between the side of the upper substrate having the upper transparent electrode and the side of the lower substrate having the lower transparent electrode,
   wherein said upper substrate, lower substrate and liquid crystal layer form a display unit, said undulated layer is disposed at the one side of the lower substrate, said reflective layer is disposed at the liquid crystal layer side having the undulated layer, said color filter is disposed at the liquid crystal layer side having the reflective layer, said lower side flattening means is disposed at the liquid crystal layer side having the color filter, said lower transparent electrode is disposed at the liquid crystal layer side having the lower side flattening means, said light shielding layer is disposed in order to suppress electric contact between the conductive portion of the reflective layer and the lower transparent electrode in the outside peripheral part of the display unit, and cover the conductive portion of the reflective layer in the outside peripheral part of the display unit, and said lower transparent electrode in the outside peripheral portion of the display unit has a shape changed in the thickness direction in the outside peripheral portion of the display unit so as to suppress breakage or shorting of the wiring section of the lower transparent electrode.

4. The reflective liquid crystal display element of claim 3, wherein said lower side flattening means is disposed at the liquid crystal layer side of the light shielding layer.

5. The reflective liquid crystal display element of claim 4, wherein said lower side flattening means has a shape changed in stair steps in the thickness direction of the liquid crystal layer in the outside peripheral portion of the display unit so as to suppress breakage or shorting of the wiring section of the lower transparent electrode.

6. A reflective liquid crystal display element comprising:
(a) an upper substrate, said upper substrate including:
a birefringent film and a polarizing film disposed at one side thereof, and
an upper transparent electrode disposed on the other side thereof,
(b) a lower substrate, said lower substrate including, at one side thereof,
an undulated layer,
a reflective layer for reflecting light,
lower side flattening means for flattening said undulated layer,
a lower transparent electrode, and
a connection terminal for connecting with an external circuit, and
(c) a liquid crystal layer, said liquid crystal layer being disposed between the side of the upper substrate having the upper transparent electrode and the side of the lower substrate having the lower transparent electrode,
wherein said upper substrate, lower substrate and liquid crystal layer form a display unit, said undulated layer is disposed at the one side of the lower substrate, said reflective layer is disposed at the liquid crystal layer side having the undulated layer, said lower side flattening means is disposed at the liquid crystal layer side having the reflective layer, said lower transparent electrode is disposed at the liquid crystal layer side having the lower side flattening means, and
said connection terminal is disposed in the peripheral portion of the lower substrate, and the connection terminal and lower substrate are connected through the lower transparent electrode, said undulated layer and said reflective layer not disposed on the portion of the lower substrate located beneath said connection terminal.

7. The reflective liquid crystal display element of claim 6, wherein the upper limit of the dimensional difference in the thickness direction between the convex part and concave part of the flattened surface of the lower side flattening means is 0.1 µm.

8. The reflective liquid crystal display element of claim 7, wherein said liquid crystal layer has a twist angle of liquid crystal in a range of 220° to 270°.

9. The reflective liquid crystal display element of claim 8, wherein the retardation value expressed as the product $\Delta n_{LC} \cdot d_{LC}$ of the birefringence $\Delta n_{LC}$ of liquid crystal and liquid crystal layer thickness $d_{LC}$ is in a range of 700 nm to 1000 nm.

10. A reflective liquid crystal display element comprising:
(a) an upper substrate, said upper substrate including
a birefringent film and a polarizing film disposed at one side thereof, and
an upper transparent electrode having a color filter, upper side flattening means and upper transparent electrode disposed on the other side thereof,
(b) a lower substrate, said lower substrate including, at one side thereof,
an undulated layer,
a reflective layer for reflecting light,
lower side flattening means for flattening said undulated layer,
a lower transparent electrode, and
a connection terminal for connecting with an external circuit, and
(c) a liquid crystal layer, said liquid crystal layer being disposed between the side of the upper substrate having the upper transparent electrode and the side of the lower substrate having the lower transparent electrode,
wherein said upper substrate, lower substrate and liquid crystal layer form a display unit, said undulated layer is disposed at the one side of the lower substrate, said reflective layer is disposed at the liquid crystal layer side having the undulated layer, said lower side flattening means is disposed at the liquid crystal layer side having the reflective layer, said lower transparent electrode is disposed at the liquid crystal layer side having the lower side flattening means, said connection terminal is disposed in the peripheral portion of the lower substrate, and the connection terminal and lower substrate are connected through the lower transparent electrode, said undulated layer and said reflective layer not disposed on the portion of the lower substrate located beneath said connection terminal, said upper side flattening means is disposed at the liquid crystal layer side of the color filter, and
said upper transparent electrode is disposed at the liquid crystal layer side of the upper side flattening means.

11. The reflective liquid crystal display element of claim 10, wherein the upper limit of the dimensional difference in the thickness direction between the convex part and concave part of the flattened surface of the lower side flattening means is 0.1 µm.

12. The reflective liquid crystal display element of claim 11, wherein said liquid crystal layer has a twist angle of liquid crystal in a range of 220° to 270°.

13. The reflective liquid crystal display element of claim 12, wherein the retardation value expressed as the product $\Delta n_{LC} \cdot d_{LC}$ of the birefringence $\Delta n_{LC}$ of liquid crystal and liquid crystal layer thickness $d_{LC}$ is in a range of 700 nm to 1000 nm.

14. A reflective liquid crystal display element comprising:
(a) an upper substrate, said upper substrate including
a birefringent film and a polarizing film disposed at one side thereof, and
an upper transparent electrode disposed on the other side thereof,
(b) a lower substrate, said lower substrate including, at one side thereof,
an undulated layer,
a reflective layer for reflecting light,
a color filter,
lower side flattening means for flattening said undulated layer,
a lower transparent electrode, and a connection terminal for connecting with an external circuit, and (c) a liquid crystal layer, said liquid crystal layer being disposed between the side of the upper substrate having the upper transparent electrode and the side of the lower substrate having the lower transparent electrode, wherein said upper substrate, lower substrate and liquid crystal layer form a display unit, said undulated layer is disposed at the one side of the lower substrate, said reflective layer is disposed at the liquid crystal layer side having the undulated layer, said color filter is disposed at the liquid crystal layer side having the reflective layer, said lower side flattening means is disposed at the liquid crystal layer side having the color filter, said lower transparent electrode is disposed at the liquid crystal layer side having the lower side flattening means, and said connection terminal is disposed in the peripheral portion of the lower substrate, and the connection terminal and lower substrate are connected through the lower transparent electrode, said undulated layer and said reflective layer not disposed on the portion of the lower substrate located beneath said connection terminal.

15. The reflective liquid crystal display element of claim 14, wherein the upper limit of the dimensional difference in the thickness direction between the convex part and concave part of the flattened surface of the lower side flattening means is 0.1 μm.

16. The reflective liquid crystal display element of claim 15, wherein said liquid crystal layer has a twist angle of liquid crystal in a range of 220° to 270°.

17. The reflective liquid crystal display element of claim 16, wherein the retardation value expressed as the product $\Delta n_{LC} \cdot d_{LC}$ of the birefringence $\Delta n_{LC}$ of liquid crystal and liquid crystal layer thickness $d_{LC}$ is in a range of 700 nm to 1000 nm.

18. An image display device having a reflective liquid crystal display element of claim 1.

19. An image display device having a reflective liquid crystal display element of claim 3.

20. An image display device having a reflective liquid crystal display element of claim 6.

21. An image display device having a reflective liquid crystal display element of claim 10.

22. An image display device having a reflective liquid crystal display element of claim 14.

23. The reflective liquid crystal display element of claim 1, wherein said light-shielding layer comprises a black matrix.

24. The reflective liquid crystal display element of claim 3, wherein said light-shielding layer comprises a black matrix.

* * * * *